United States Patent
Kimura et al.

(10) Patent No.: US 12,110,622 B2
(45) Date of Patent: Oct. 8, 2024

(54) INORGANIC FIBER-FORMED ARTICLE, MAT FOR EXHAUST GAS CLEANING APPARATUS, AND EXHAUST GAS CLEANING APPARATUS

(71) Applicant: MAFTEC CO., LTD., Tokyo (JP)

(72) Inventors: Yusuke Kimura, Tokyo (JP); Hirokazu Morita, Tokyo (JP); Kazunori Kawahara, Tokyo (JP); Masanobu Yomogida, Tokyo (JP); Hiromitsu Tsutsui, Tokyo (JP)

(73) Assignee: MAFTEC CO., LTD., Tokyo (JP)

( * ) Notice: Subject to any disclaimer, the term of this patent is extended or adjusted under 35 U.S.C. 154(b) by 417 days.

(21) Appl. No.: 17/484,292

(22) Filed: Sep. 24, 2021

(65) Prior Publication Data

US 2022/0010470 A1     Jan. 13, 2022

Related U.S. Application Data

(63) Continuation of application No. PCT/JP2020/029992, filed on Aug. 5, 2020.

(30) Foreign Application Priority Data

Aug. 6, 2019  (JP) .................................. 2019-144390
May 27, 2020  (JP) .................................. 2020-092409

(51) Int. Cl.
- *D04H 1/46* (2012.01)
- *D04H 1/4209* (2012.01)
- *F01N 3/28* (2006.01)

(52) U.S. Cl.
CPC ............. *D04H 1/46* (2013.01); *D04H 1/4209* (2013.01); *F01N 3/2835* (2013.01); *F01N 3/2853* (2013.01); *D10B 2101/02* (2013.01); *D10B 2101/08* (2013.01); *F01N 2330/06* (2013.01); *F01N 2330/10* (2013.01); *F01N 2340/00* (2013.01)

(58) Field of Classification Search
None
See application file for complete search history.

(56) References Cited

U.S. PATENT DOCUMENTS

| | | |
|---|---|---|
| 5,671,518 A | 9/1997 | Kummermehr et al. |
| 2009/0272600 A1 | 11/2009 | Okabe et al. |
| 2012/0219464 A1 | 8/2012 | Sasaki et al. |
| 2018/0100421 A1 | 4/2018 | Wakamatsu et al. |

FOREIGN PATENT DOCUMENTS

| | | |
|---|---|---|
| JP | H06-299450 A | 10/1994 |
| JP | H06-509849 A | 11/1994 |
| JP | 2009-085091 A | 4/2009 |

(Continued)

OTHER PUBLICATIONS

Extended European Search Report issued in corresponding European Patent Application No. 20850960.4 dated Mar. 24, 2022.

(Continued)

*Primary Examiner* — Shawn Mckinnon

(74) *Attorney, Agent, or Firm* — Morgan, Lewis & Bockius LLP

(57) ABSTRACT

Provided are an article having inorganic fibers and needle marks extending in the thickness direction and including vertical bundles composed of the inorganic fibers extending in the thickness direction.

8 Claims, 1 Drawing Sheet

(56) References Cited

FOREIGN PATENT DOCUMENTS

| | | |
|---|---|---|
| JP | 2018-009262 A | 1/2018 |
| JP | 2019-116076 A | 7/2019 |
| WO | 2009/133613 A1 | 11/2009 |
| WO | 2011/055736 A1 | 5/2011 |
| WO | 2021/025058 A1 | 2/2021 |

OTHER PUBLICATIONS

Canadian Office Action issued in corresponding Canadian Patent Application No. 3125733 dated Sep. 23, 2021.
International Search Report issued in related International Patent Application No. PCT/JP2020/029992 dated Oct. 13, 2020.

INORGANIC FIBER-FORMED ARTICLE, MAT FOR EXHAUST GAS CLEANING APPARATUS, AND EXHAUST GAS CLEANING APPARATUS

TECHNICAL FIELD

The present invention relates to an inorganic fiber-formed article subjected to needling. The present invention also relates to a mat formed of the inorganic fiber-formed article for an exhaust gas cleaning apparatus, that is, a holding member for a catalyst carrier of an exhaust gas cleaning apparatus, and an exhaust gas cleaning apparatus including the mat for an exhaust gas cleaning apparatus.

BACKGROUND ART

Formed articles of inorganic fibers typified by ceramic fibers have been used for applications exposed to high temperatures, for example, industrial heat insulators, refractory materials, and packing materials. Additionally, formed articles of inorganic fibers are used as mats (catalyst-holding materials) for automotive exhaust gas cleaning apparatuses. Catalyst-holding materials are cushioning materials for exhaust gas cleaning apparatuses, cushioning materials being wrapped around catalyst carriers and interposed (in gaps) between catalyst carriers and metal casings when catalyst carriers are housed in metal casings. To improve catalytic efficiency, there has recently been a tendency to position exhaust gas cleaning apparatuses in high-temperature sections immediately below engines. Thus, in order to cope with gap extension at higher temperatures and prevent leakage of exhaust gases and damage to catalyst carriers, inorganic fiber-formed articles are required to have a high basis weight.

Patent Literature 1 describes a mat material containing an inorganic fiber and having multiple needle marks formed by needling, the needle marks extending from a first surface toward a second surface and extending from the second surface toward the first surface, in which the needle marks are formed so as not to penetrate therethrough in the thickness direction, and substantially no protruding portion of an inorganic fiber bundle is present. Claim 3 of Patent Literature 1 states that the mat material preferably has a basis weight of 1,500 g/m² to 2,800 g/m². However, there have been increasing demands for inorganic fiber-formed articles. An inorganic fiber-formed article subjected to needling by a method described in Patent Literature 1 had insufficient peel strength in the thickness direction.

Patent Literature 2 describes a multilayer mat in which multiple mat elements composed of fired inorganic fibers are bonded together. An adhesive layer that bonds the mat elements together is disposed between the mat elements. Multiple holes are arranged on main surfaces of the mat elements facing each other. The insides of the holes are filled with an adhesive included in the adhesive layer. An example of Patent Literature 2 discloses a multilayer mat in which two fired sheet-like articles each having a basis weight of 1,050 g/m² and being composed of inorganic fibers are bonded together. However, the multilayer mat in which the fired sheet-like articles composed of inorganic fibers are bonded together with an adhesive may peel off between bonded layers.

CITATION LIST

Patent Literature

PTL 1: Japanese Unexamined Patent Application Publication No. 2009-085091

PTL 2: Japanese Unexamined Patent Application Publication No. 2019-116076

As described above, in the past there has been no inorganic fiber-formed article that has undergone needling and that has both high basis weight and excellent peel strength.

SUMMARY OF INVENTION

Technical Problem

The present invention aims to provide an inorganic fiber-formed article having both high basis weight and excellent peel strength and a mat for an exhaust gas cleaning apparatus and an exhaust gas cleaning apparatus including the inorganic fiber-formed article.

Solution to Problem

The inventors have focused on the form of vertical bundles that are composed of inorganic fibers and that extend in the thickness direction of an inorganic fiber-formed article. Hitherto, vertical bundles in inorganic fiber-formed articles having high basis weight have an average volume of about 0.01 to about 0.2 mm³ per needle mark. Additionally, the volume of each effective vertical bundle is about 0.02 to about 0.9 mm³ on average. The inventors have found that in the case of an inorganic fiber-formed article in which the average volume of vertical bundles is within a specific range, the vertical bundles are firmly formed to enable the achievement of both high basis weight and peel strength, which are conflicting physical properties.

The gist of an inorganic fiber-formed article of the present invention is described below.

An article, comprising:

inorganic fibers; and needle marks extending in a thickness direction and each including a vertical bundle comprising inorganic fibers extending in the thickness direction.

In the article, (I) the article has a basis weight of 1,800 g/m² or more, and (II-1) an average volume of an effective vertical bundles per needle mark (v/n), determined by dividing a total volume of the effective vertical bundles in the region (v) by the number of the needle marks in the region (n), is 0.5 mm³ or more, wherein the effective vertical bundles are vertical bundles having a diameter of 100 μm or more and a protruding length of 2 mm or more among vertical bundles protruding from peeled surfaces in a region measuring 50 mm×50 mm after a peel test is performed, and in the peel test, a test specimen having a width of 50 mm and a length of 150 mm is cut out from the article, a cut having a depth of 30 mm is made in a middle of a thickness of an end face of the test specimen, and both ends formed by the cut are held by gripping jigs, mounted on a tensile testing machine, and pulled in opposite thickness directions at a speed of 500 mm/min into two pieces, or (II-2) an average volume per an effective vertical bundle (V/N), determined by dividing the total volume of the effective vertical bundles (V) by the number of the effective vertical bundles (N), is 1.0 mm³ or more.

In one embodiment of the present invention, a needle mark density is 1 to 100 marks/cm².

In one embodiment of the present invention, a maximum peel strength determined as a peak load in the peel test is 5.0 N or more.

In one embodiment of the present invention, the inorganic fibers are alumina/silica-based fibers.

In one embodiment of the present invention, the average volume of the effective vertical bundles per needle mark (v/n) is 0.5 mm$^3$ or more.

In one embodiment of the present invention, the average volume per an effective vertical bundle (V/N) is 1.0 mm$^3$ or more.

A mat for an exhaust gas cleaning apparatus of the present invention includes the article of the present invention.

An exhaust gas cleaning apparatus includes a catalyst carrier, a casing that covers the outside of the catalyst carrier, and a mat interposed between the catalyst carrier and the casing, in which the mat is the mat for an exhaust gas cleaning apparatus of the present invention.

Advantageous Effects of Invention

The inorganic fiber-formed article of the present invention satisfies at least one of characteristics (I) and (II); thus, the fibers in the substantially thickness direction are firmly entangled with each other inside the inorganic fiber-formed article to enable the inorganic fiber-formed article to have a high basis weight and excellent peel strength.

DESCRIPTION OF EMBODIMENTS

Figure 1:
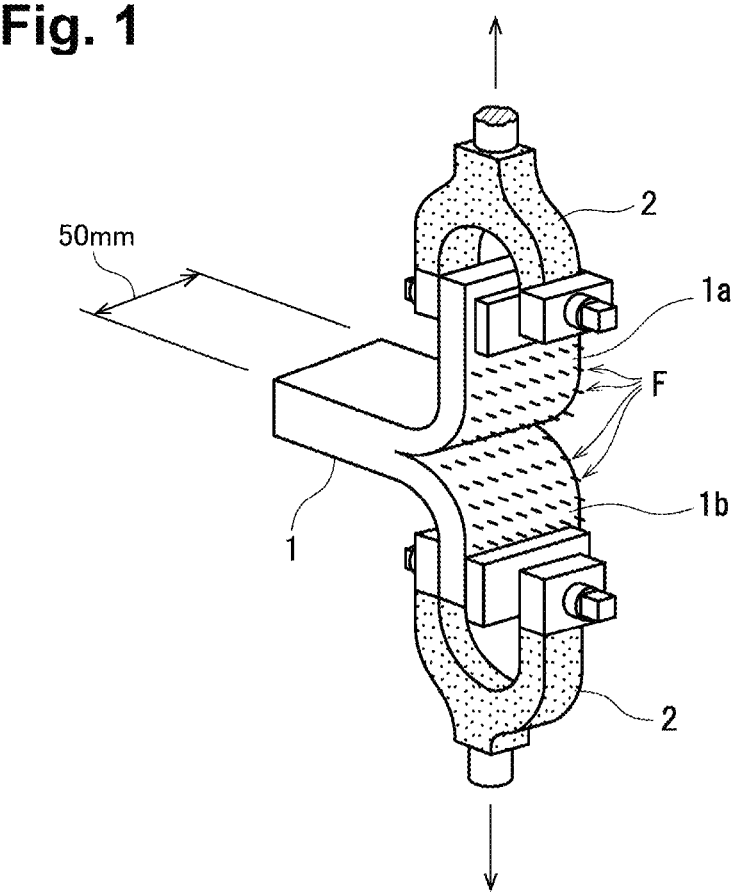
FIG. 1 is an explanatory drawing of a peel strength test.

Embodiments of the present invention will be described in detail below.

The expression "a to b" in a numerical range indicates "a or more and b or less."

Even when the upper and lower limits of a numerical range in the present specification are slightly beyond the numerical range specified by the present invention, they are included within the equivalent scope of the present invention as long as the same effects as those in the numerical range specified by the present invention are provided.

[Inorganic Fiber-Formed Article]

The inorganic fiber-formed article of the present invention comprises:

inorganic fibers; and needle marks extending in a thickness direction and including vertical bundles composed of the inorganic fibers extending in the thickness direction, wherein the inorganic fiber-formed article has a basis weight of 1,800 g/m$^2$ or more, in the case in which a peel test described below is performed, when the vertical bundles having a diameter of 100 μm or more and a protruding length of 2 mm or more among all the vertical bundles protruding from a first peeled surface and a second peeled surface in a region measuring 50 mm×50 mm are expressed as effective vertical bundles, at least one of characteristics (I) and (II) described below is satisfied.

(I) An average volume of the effective vertical bundles per needle mark, determined by dividing a total volume of portions of the effective vertical bundles protruding from the peeled surfaces in the region by the number of the needle marks in the region, is 0.5 mm$^3$ or more.

(II) An average volume of a portion of each of the effective vertical bundles protruding from the peeled surfaces in the region is 1.0 mm$^3$ or more.

The inorganic fiber-formed article of the present invention is formed of inorganic fibers and subjected to needling. The inorganic fiber-formed article has a mat shape having a predetermined thickness. Hereinafter, a surface of the inorganic fiber-formed article perpendicular to the thickness direction may also be referred to as a "mat surface." A side face (a face extending in the thickness direction) of the inorganic fiber-formed article perpendicular to the mat surface may also be referred to as an "end face."

[Method for Producing an Inorganic Fiber-Formed Article]

The inorganic fiber-formed article of the present invention can be produced by a method including a step of forming a mat-like aggregate of an inorganic fiber precursor by a sol-gel method, a step of subjecting the resulting mat-like aggregate of the inorganic fiber precursor to needling, and a firing step of firing the mat-like aggregate of the inorganic fiber precursor subjected to the needling into an inorganic fiber-formed article. However, the inorganic fiber-formed article of the present invention may be produced by another method.

While an example of the method for producing an inorganic fiber-formed article will be described below by taking a method for producing an alumina/silica-based fiber formed article as an example, the inorganic fiber-formed article of the present invention is not limited to the alumina/silica-based fiber-formed article. As described above, the inorganic fiber-formed article may be a formed article formed of fibers of silica, zirconia, spinel, or titania, or composite fibers thereof.

<Spinning Step>

To produce a mat-like aggregate of alumina/silica-based fibers by a sol-gel method, fibers are spun from a spinning solution containing basic aluminum chloride, a silicon compound, an organic polymer serving as a thickener, and water by a blowing method into an alumina/silica fiber precursor aggregate.

<<Preparation of Spinning Solution>>

Basic aluminum chloride $Al(OH)_{3-x}Cl_x$ can be prepared by, for example, dissolving metal aluminum in hydrochloric acid or an aqueous solution of aluminum chloride. In the chemical formula described above, the value of x is usually in the range of 0.45 to 0.54 and preferably 0.5 to 0.53. As the silicon compound, a silica sol is preferably used. Tetraethyl silicate or a water-soluble silicon compound, such as a water-soluble siloxane derivative, may also be used. As the organic polymer, for example, a water-soluble polymer compound, such as polyvinyl alcohol, polyethylene glycol, or polyacrylamide, is preferably used. They usually have a degree of polymerization of 1,000 to 3,000.

With respect to the spinning solution, the ratio of aluminum originating from basic aluminum chloride to silicon originating from the silicon compound is usually 99:1 to 65:35 and preferably 99:1 to 70:30 in terms of $Al_2O_3$ and $SiO_2$ on a weight basis. The spinning solution preferably has an aluminum concentration of 170 to 210 g/L and an organic polymer concentration of 20 to 50 g/L.

In the case in which the amount of the silicon compound in the spinning solution is smaller than the above range, alumina contained in short fibers is easily transformed into α-alumina. Furthermore, alumina particles coarsen, thereby easily causing embrittlement of the short fibers. In the case in which the amount of the silicon compound in the spinning solution is larger than the above range, the amount of silica ($SiO_2$) formed together with mullite ($3Al_2O_3 \cdot 2SiO_2$) is increased, thereby easily causing a decrease in heat resistance.

In the case in which the spinning solution has an aluminum concentration of less than 170 g/L or an organic polymer concentration of less than 20 g/L, the spinning solution does not have an appropriate viscosity, thereby causing the resulting alumina/silica-based fibers to have a smaller fiber diameter. That is, the excessively large amount of free water in the spinning solution results in a low drying rate during the spinning by the blowing method to lead to excessive extension. This causes the spun precursor fibers to have varying diameters, failing to produce short fibers having a predetermined average fiber diameter and a sharp fiber diameter distribution. Furthermore, an aluminum concentration of less than 170 g/L results in a decrease in productivity. At an aluminum concentration of more than 210 g/L or an organic polymer concentration of more than 50 g/L, an excessively high viscosity is obtained in either case; thus, the solution cannot be used as a spinning solution. The spinning solution preferably has an aluminum concentration of 180 to 200 g/L and an organic polymer concentration of 30 to 40 g/L.

The foregoing spinning solution is prepared by adding the silicon compound and the organic polymer to an aqueous solution of basic aluminum chloride in amounts to satisfy the foregoing ratio of $Al_2O_3:SiO_2$ and concentrating the mixture in such a manner that the aluminum concentration and the concentration of the organic polymer are within the above ranges.

<<Blowing>>

Spinning (the formation of fibers from the spinning solution) is usually performed by a blowing method in which a spinning solution is fed into a high-velocity spinning gas flow, thereby producing a short-fiber alumina precursor. The structure of a spinning nozzle used in the spinning described above is not particularly limited. For example, as described in Japanese Patent No. 2602460, a structure is preferred in which an airflow emerging from an air nozzle and the flow of a spinning solution emerging from a spinning solution supply nozzle are parallel to each other and in which the parallel flow of air is sufficiently rectified and comes into contact with the spinning solution.

With respect to spinning, preferably fibers sufficiently drawn from the spinning solution are formed under conditions in which the evaporation of water and the decomposition of the spinning solution are prevented, and then the resulting fibers are rapidly dried. To this end, the atmosphere is preferably changed from a state in which the evaporation of water is suppressed to a state in which the evaporation of water is promoted, in the course from the formation of the fibers from the spinning solution to the arrival of the fibers at a fiber-collecting device.

The alumina/silica-based fiber precursor can be collected, accumulated, and recovered in the form of a continuous sheet-like aggregate (thin-layer sheet) composed of the alumina/silica-based fiber precursor with an accumulating device having a structure in which a wire-mesh endless belt is positioned so as to be substantially perpendicular to the spinning airflow and in which the spinning airflow containing the alumina/silica-based fiber precursor impinges on the belt while the endless belt is rotated.

The thin-layer sheet preferably, but not necessarily, has a basis weight of about 10 to about 200 g/m², and particularly preferably about 30 to about 100 g/m².

The thin-layer sheet recovered by the accumulating device can then be stacked. Specifically, for example, the inorganic fiber precursor aggregate (thin-layer sheet) is continuously unwound and fed to a folding device. The thin-layer sheet is folded to a predetermined width and stacked. Simultaneously, the folded sheet is continuously transferred in a direction perpendicular to a folding direction to form a laminated aggregate (laminated sheet) composed of the inorganic fiber precursor. The stacking of the thin-layer sheet in this manner provides the laminated sheet having a uniform basis weight (weight per unit area) across the entire sheet. As the foregoing folding device, a device described in Japanese Unexamined Patent Application Publication No. 2000-80547 may be used.

The laminated sheet is preferably formed by stacking five or more layers, more preferably eight or more layers, and particularly preferably 10 to 80 layers of the thin-layer sheet. However, the number of layers stacked is not limited thereto.

<Needling Aid Coating Step>

A needling aid is coated to the laminated sheet of the alumina/silica-based fiber precursor or a sheet surface of the laminated sheet obtained by spinning, as needed. The needling aid is preferably coated to both surfaces of the sheet.

Any agent effective in strengthening filaments near a mat surface of the inorganic fiber precursor aggregate can be used as the needling aid. Various coating agents, such as acrylic polymer coating agents, may be used.

After the attachment of the needling aid, the mat-shaped inorganic fiber precursor aggregate may be dried. In other words, the needling aid is preferably attached by dry coating. The needling aid may be attached when the inorganic fiber precursor is accumulated.

A friction-reducing agent (surfactant or emulsion) effective in reducing the friction between needles and the fibers may be used in combination with the needling aid. In that case, the order of use of the needling aid and the friction-reducing agent is not particularly limited. For example, after the attachment of a solution of the needling aid, a solution or dispersion of the friction-reducing agent in a solvent is preferably applied by coating (wet coating).

<Needling Process>

The needling aid is coated to the laminated sheet of the alumina/silica-based fiber precursor obtained by spinning, as needed, and then the laminated sheet is subjected to needling in which barbed needles are inserted and withdrawn from the laminated sheet. The needling may be performed from one or both of the surfaces, but preferably both of the surfaces.

The insertion and withdrawal of the needles are preferably performed in the direction perpendicular to the sheet surface of the laminated sheet. The needles are inserted deeper than the center of the laminated sheet in the thickness direction. The needles may be inserted so as to penetrate through the laminated sheet in the thickness direction.

By the needling in this way, needle marks are formed on the inorganic fiber-formed article. That is, when the needling is performed in which the barbed needles are inserted and withdrawn from the inorganic fiber aggregate, the needles allow at least some of the fibers to extend in the substantially thickness direction in positions where the needles are inserted and withdrawn. This forms the needle marks on the surface of the inorganic fiber-formed article. The filaments of the inorganic fibers extending in the substantially thickness direction inside the inorganic fiber-formed article subjected to needling are referred to as "vertical bundles."

The needling is performed in order to adjust the bulk density, the peel strength, the surface pressure (surface pressure after a high-temperature cycle), and the durability of resilience (surface pressure retention after the high-temperature cycle) of the inorganic fiber-formed article by forming the vertical bundles.

The needle marks may penetrate through the inorganic fiber-formed article. Alternatively, the needle marks may extend from one mat surface so as not to reach the other mat surface.

<Firing Step>

The inorganic fiber-formed article of the present invention is preferably a fired inorganic fiber-formed article obtained by firing the inorganic fiber precursor subjected to needling. Firing after the needling is usually performed at 900° C. or higher, preferably 1,000° C. to 1,300° C. A firing temperature of 900° C. or higher results in sufficiently crystallized alumina/silica-based fibers having excellent strength and thus is preferred. A firing temperature of 1,300° C. or lower results in alumina/silica-based fibers having appropriate strength because the grain growth of the fibers does not proceed excessively, which is preferred.

[Preferred Structure of Inorganic Fiber-Formed Article]

<Inorganic Fiber>

Examples of the inorganic fibers included in the inorganic fiber-formed article of the present invention include, but are not particularly limited to, single-component fibers composed of, for example, silica, alumina/silica, silica or alumina/silica-containing zirconia, spinel, or titania; and composite fibers containing these fibers. In particular, alumina/silica-based fibers are preferred, and crystalline alumina/silica-based fibers are particularly preferred. The composition ratio (by weight) of alumina/silica of the alumina/silica-based fibers is preferably in the range of 60 to 95/40 to 5, more preferably 70 to 84/30 to 16, and particularly preferably 70 to 76/30 to 24.

The inorganic fibers are preferably short fibers. The inorganic fibers preferably have an average fiber diameter of 3 to 10 μm, particularly preferably 5 to 8 μm. When the upper limit of the average fiber diameter of the inorganic fibers is within the above range, the inorganic fiber-formed article has appropriate resilience, which is preferred. When the average fiber diameter of the inorganic fibers is within the above range, the amount of dust emitted into the air can be reduced, which is preferred.

<Needle Mark Density>

<<Method for Measuring Needle Mark Density>>

In an embodiment of the present invention, the inorganic fiber-formed article is a fired article. In this case, the needle mark density indicates the number of needle marks per unit area (1 cm$^2$) of a mat surface of the inorganic fiber-formed article after firing.

When a mat surface of the inorganic fiber-formed article is irradiated with visible light, transmitted light is observed as spots of light on a peeled surface because the amount of light transmitted through the needle marks is larger than the amount of light transmitted through a region other than the needle marks. The number of needle marks is determined by counting the number of vertical bundles and the spots of light transmitted to the peeled surface.

That is, the number of needle marks is determined by irradiating one surface of the inorganic fiber-formed article with visible light and counting the number of spots of light transmitted to the peeled surface and the vertical bundles.

<<Preferred Range of Needle Mark Density>>

In the present invention, the number of the needle marks per unit area (1 cm$^2$) (needle mark density) of a mat surface of the inorganic fiber-formed article is preferably 1 mark/cm$^2$ or more, more preferably 3 marks/cm$^2$ or more, even more preferably 5 marks/cm$^2$ or more, particularly preferably 8 marks/cm$^2$ or more, and preferably 100 marks/cm$^2$ or less, more preferably 50 marks/cm$^2$ or less, even more preferably 40 marks/cm$^2$ or less, and particularly preferably 30 marks/cm$^2$ or less on the average of the entire mat surface. When the number of the needle marks is within the above range, the surface pressure of the inorganic fiber-formed article is kept high. Thus, the inorganic fiber-formed article is particularly preferably used in applications that require satisfactory durability of resilience, such as mats for exhaust gas cleaning apparatuses.

<Basis Weight and Thickness of Inorganic Fiber-Formed Article>

The basis weight (mass per unit area) of the inorganic fiber-formed article of the present invention is appropriately determined in accordance with applications and is 1,800 g/m$^2$ or more, preferably more than 2,000 g/m$^2$, more preferably more than 2,200 g/m$^2$, even more preferably more than 2,400 g/m$^2$, and particularly preferably more than 2,600 g/m$^2$. The basis weight of the inorganic fiber-formed article of the present invention is preferably, but not necessarily, 5,000 g/m$^2$ or less, more preferably 4,500 g/m$^2$ or less, and particularly preferably 4,000 g/m$^2$ or less.

The inorganic fiber-formed article of the present invention preferably has a thickness of 10 mm or more, more preferably 11 mm or more, and particularly preferably 12 mm or more. The inorganic fiber-formed article of the present invention preferably has a thickness of 40 mm or less, more preferably 30 mm or less, more preferably 25 mm or less, and particularly preferably 23 mm or less.

When the inorganic fiber-formed article of the present invention has a larger basis weight per unit area and a larger thickness, the inorganic fiber-formed article can have better heat retention and insulation effects. A larger basis weight per unit area and a larger thickness commonly result in a tendency to lead to lower delamination strength. A larger volume of the effective vertical bundles results in greater effects of the present invention.

The basis weight per unit area and the thickness of the inorganic fiber-formed article can be adjusted to the above ranges by adjusting the amount of fibers per unit area when the inorganic fiber aggregate included in the inorganic fiber-formed article is stacked with a folding machine. The inorganic fiber-formed article of the present invention may have a structure in which multiple inorganic fiber-formed articles are bonded together or a single structure. From the viewpoints of handleability and peel strength at a bonding interface, the single structure is preferred.

<Vertical Bundle>

The inorganic fiber-formed article of the present invention includes the needle marks formed by the needling. As described above, when the needling is performed in which the barbed needles are inserted and withdrawn from the inorganic fiber aggregate, the needles allow at least some of the fibers to extend in the substantially thickness direction in positions where the needles are inserted and withdrawn. The filaments of the inorganic fibers that are formed by the needling that are present inside the inorganic fiber-formed article and that are formed in the substantially thickness direction are referred to as "vertical bundles."

<Effective Vertical Bundle>

In the present invention, among the vertical bundles present inside the inorganic fiber-formed article, the vertical bundles having a specific diameter and a specific length are defined as "effective vertical bundles." Specifically, in the case in which a peel test described below is performed, the vertical bundles having a diameter of 100 μm or more and a protruding length of 2 mm or more among all the vertical bundles F (FIG. 1) protruding from both peeled surfaces (a first peeled surface 1a and a second peeled surface 1b) in a unit area (50 mm×50 mm) are defined as "effective vertical bundles." The unit area (50 mm×50 mm) where numerical values regarding the vertical bundles are measured is a freely selected region of a test specimen (150 mm×50 mm), excluding a portion where a cut having a depth of 30 mm is made in the middle of the thickness.

Among the vertical bundles present in the substantially thickness direction inside the inorganic fiber-formed article, the effective vertical bundles have a diameter and a length that act to adjust the bulk density, the peel strength, and the durability of resilience (surface pressure retention after the high-temperature cycle) of the inorganic fiber-formed article.

[Explanation of Characteristics I and II]

<Peel Test>

Figure 2:
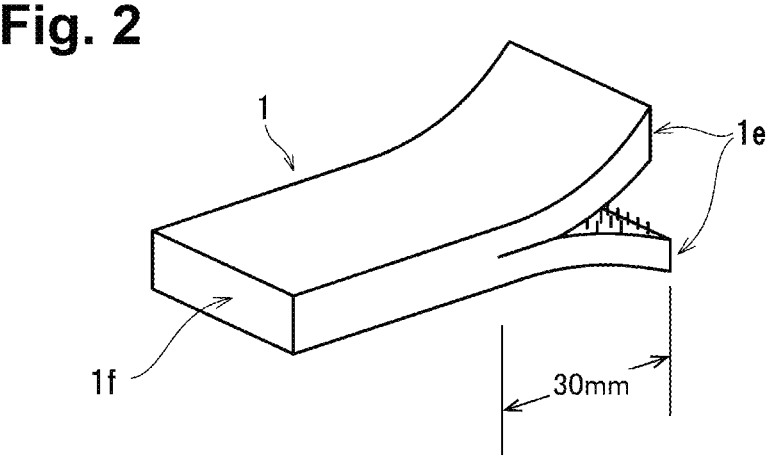
FIG. 2 is an explanatory drawing of a test specimen for a peel strength test.

A test specimen 1 having a width of 50 mm and a length of 150 mm is cut out from the inorganic fiber-formed article. A cut having a depth of 30 mm is made in the middle of the thickness of an end face 1e of the test specimen 1, as illustrated in FIG. 2. The cut is formed so as to extend from one end to the other end in the width direction. As illustrated in FIG. 1, both ends formed by the cut are held by gripping jigs 2, mounted on a tensile testing machine, and pulled in opposite directions perpendicular to a mat surface (upward and downward directions in FIG. 1) at a speed of 500 mm/min into two pieces.

<Maximum Peel Strength>

As illustrated in FIG. 1, when the test specimen 1 is pulled in the opposite directions perpendicular to the mat surface at a speed of 500 mm/min into two pieces, the maximum value (N) of the peak load is defined as "maximum peel strength."

In the inorganic fiber-formed article of the present invention, the maximum peel strength determined as a peak load (N) in the peel test described above is preferably 5.0 N or more, more preferably 6.0 N or more, and particularly preferably 6.5 N or more. Although higher peel strength of the inorganic fiber-formed article is more advantageous, the maximum peel strength is preferably 50.0 N or less, more preferably 45.0 N or less, and particularly preferably 40.0 N or less.

The inorganic fiber-formed article of the present invention is preferably excellent in peel strength in order to minimize a decrease in workability and minimize a difference in density distribution during the formation when processed into a heat insulator. Additionally, the article is preferably excellent in peel strength in order not to cause the interlayer displacement of the mat when the article in the form of a mat for an exhaust gas cleaning apparatus used for automobiles is wrapped around a catalyst carrier and assembled in a metal casing.

<Total Volume V of Portion of Effective Vertical Bundle Protruding from Peeled Surface>

After the peel test described above is performed, the number (filament number) N, the diameter (thickness) D, and the length (length protruding from the peeled surface 1a or 1b) L of the effective vertical bundles protruding from the peeled surfaces 1a and 1b are measured with a digital microscope. The measurement magnification of the digital microscope is preferably ×10 to ×20. The length L is the length of portions protruding from the peeled surface 1a or 1b and having a diameter of 100 μm or more are measured. The diameter D is a value measured in the middle, in the longitudinal direction, of each portion protruding from the peeled surface 1a or 1b.

The total volume V of the portions of the effective vertical bundles protruding from the peeled surfaces in the region measuring 50 mm×50 mm is a value obtained by calculating the volume ($\pi D^2 \cdot L/4$) of each of the portions of the N effective vertical bundles protruding from the peeled surface 1a or 1b and calculating the total volume.

In the inorganic fiber-formed article of the present invention, the total volume (the sum of the volumes) V of the portions of the effective vertical bundles protruding from the peeled surfaces is preferably 2.0 $mm^3/cm^2$ or more, more preferably 4.0 $mm^3/cm^2$ or more, even more preferably 8.0 $mm^3/cm^2$ or more, and particularly preferably 12.0 $mm^3/cm^2$ or more. When the total volume of the effective vertical bundles is within the above range, the vertical bundles are more firmly present inside the inorganic fiber-formed article. Thus, the delamination strength in the substantially thickness direction can be further improved.

The value of the total volume (the sum of the volumes) V is preferably 50 $mm^3$ or more, more preferably 100 $mm^3$ or more, even more preferably 200 $mm^3$ or more, and particularly preferably 300 $mm^3$ or more when converted into a value per unit area (50 mm×50 mm).

<Average Volume of Portion of Effective Vertical Bundles Protruding from Peeled Surface Per Needle Mark (Characteristic I)>

The number n of the needle marks in the region measuring 50 mm×50 mm is measured by the measurement method described above. The total volume V determined by performing the peel test is divided by n to determine the average volume of the portions of the effective vertical bundles protruding from the peeled surfaces per needle mark (hereinafter, also referred to as an "average volume of the effective vertical bundles per needle mark").

That is, the average volume of the effective vertical bundles per needle mark is a value V/n obtained by dividing the sum of the volumes (total volume) V of all the portions of the effective vertical bundles that protrude from the peeled surfaces and that are present on both peeled surfaces (the first peeled surface and the second peeled surface) per unit area (50 mm×50 mm) by the number n of the needle marks per unit area when the peel test is performed. In the case of a larger average volume V/n of the effective vertical bundles per needle mark, the needling is effectively performed, thereby forming stronger effective vertical bundles.

In the inorganic fiber-formed article according to a first embodiment, the average volume V/n of the effective vertical bundles per needle mark is 0.5 $mm^3$ or more, more preferably 1.0 $mm^3$ or more, even more preferably 2.0 $mm^3$ or more, and particularly preferably 2.5 $mm^3$ or more. When the average volume of the effective vertical bundles per needle mark is within the above range, the peel strength can be improved. The peeling of the mat can be prevented when a catalyst carrier for an exhaust gas cleaning apparatus and a holding member therefor (a mat for an exhaust gas cleaning apparatus) are press-fit into a metal casing. The average volume V/n of the effective vertical bundles per needle mark in the inorganic fiber-formed article according to the first embodiment is preferably 50 $mm^3$ or less, more preferably 30 $mm^3$ or less, and particularly preferably 20 $mm^3$ or less.

<Average Volume of Portion of Each Effective Vertical Bundle Protruding from Peeled Surface (Characteristic II)>

The average volume of a portion of each of the effective vertical bundles protruding from the peeled surfaces (hereinafter, also referred to as an "average volume per effective vertical bundle") is determined by dividing the total volume V described above by the number N of the effective vertical bundles.

That is, the average volume per effective vertical bundle is a value V/N obtained by dividing the sum of the volumes (total volume) V of all the portions of the effective vertical bundles that protrude from the peeled surfaces and that are present on both peeled surfaces (the first peeled surface and the second peeled surface) per unit area (50 mm×50 mm) by the number N of the effective vertical bundles per unit area when the peel test is performed. In the case of a larger average volume V/N per effective vertical bundle in the inorganic fiber-formed article, the needling is effectively performed, thereby forming stronger effective vertical bundles.

In the inorganic fiber-formed article according to a second embodiment, the average volume V/N per effective vertical bundle is 1.0 mm$^3$ or more, more preferably 2.0 mm$^3$ or more, even more preferably 3.0 mm$^3$ or more, and particularly preferably 4.0 mm$^3$ or more. When the average volume V/N per effective vertical bundle is within the above range, the peel strength can be improved. The peeling of the mat can be prevented when a catalyst carrier for an exhaust gas cleaning apparatus and a holding member therefor (a mat for an exhaust gas cleaning apparatus) are press-fit into a metal casing. The average volume V/N of each effective vertical bundle per effective vertical bundle is preferably 100 mm$^3$ or less, more preferably 50 mm$^3$ or less, and particularly preferably 40 mm$^3$ or less.

In the case of an inorganic fiber-formed article having a low basis weight, it is conceivable to employ a method for increasing the entanglement of the fibers in the substantially thickness direction by increasing the needle mark density in order to improve the peel strength of the inorganic fiber-formed article. In the case of an inorganic fiber-formed article having a high basis weight, however, an increase in needle mark density may deteriorate other physical properties, and there was no method to improve the peel strength. To improve the peel strength while other physical properties are maintained, in the first embodiment the average volume V/n of the effective vertical bundles per needle mark is 0.5 mm$^3$ or more. In the second embodiment the average volume V/N per effective vertical bundle is 1.0 mm$^3$ or more. Thereby, the vertical bundles are formed more firmly.

In the case of satisfying at least one of characteristics (I) and (II) in the present invention, the vertical bundles formed by the needling are strengthened, thus reducing filament breakage.

Examples of a method for strengthening the vertical bundles include, but are not particularly limited to, specific methods (i) and (ii) described below.

(i) Thick filaments composed of the inorganic fiber precursor are arranged on a surface of the inorganic fiber precursor aggregate and pushed into the inorganic fiber precursor aggregate with needles during the needling to form the vertical bundles.

The type of needle for needling the thick filaments is preferably, but not necessarily, a fork needle. The thick filaments are preferably composed of the same material as the inorganic fiber precursor. In particular, the thick filaments are preferably thick, stringlike filaments that are formed of precursor fibers aligned in one direction and that are formed as a byproduct formed in the accumulating device when the inorganic fiber precursor aggregate is formed. Additionally, the thick, stringlike filaments are preferably formed of a short-fiber aggregate. The average diameter of the thick, stringlike filaments is preferably 1.2 or more times, particularly preferably 1.5 or more times, preferably 4 or less times, and particularly preferably 3 or less times of the average diameter of the effective vertical bundles.

(ii) Prior to the needling, a solution of a needling aid is adhered (coated) to a surface of the inorganic fiber precursor aggregate by spraying or the like, thereby improving the physical properties of the inorganic fiber precursor to be formed into the vertical bundles. Preferred needling aids are as described above.

<Average Thickness of the Effective Vertical Bundles>

In the present invention, the effective vertical bundles preferably have an average thickness (diameter) of 550 μm or more, more preferably 600 μm or more, and particularly preferably 700 μm or more. The effective vertical bundles preferably have an average thickness of 3,000 μm or less, more preferably 2,800 μm or less, and particularly preferably 2,500 μm or less. When the average thickness of the effective vertical bundles is within the above range, a blanket (an inorganic fiber-formed article) being less likely to break at the time of the application of an external force to the effective vertical bundles and having high peel strength is obtained.

<Average Length of the Effective Vertical Bundles>

Regarding the vertical bundles of the inorganic fiber-formed article of the present invention, the average length L' of the effective vertical bundles on the first peeled surface is preferably within a specific percentage range with respect to the thickness z of the second peeled surface (that is, one-half of the total thickness of the inorganic fiber-formed article). That is, when the peel test is performed, the percentage (L'/z)·100(%) obtained by dividing the average length L' of the effective vertical bundles on the first peeled surface per unit area (50 mm×50 mm) by the thickness z of the second peeled surface is preferably 50% or more, more preferably 60% or more, and particularly preferably 70% or more. When the percentage (L'/z)·100(%) is within the above range, the peel strength can be further improved, which is preferred. The percentage (L'/z)·100(%) is preferably 200% or less, and more preferably 150% or less. When the percentage (L'/z)·100(%) is within the above range, the protrusion of closed loops can be suppressed to a small size to reduce troubles in the process.

<Number of Effective Vertical Bundles Per Unit Area>

In the inorganic fiber-formed article of the present invention, the total number of effective vertical bundles present on both peeled surfaces per unit area (50 mm×50 mm) is preferably 20 or more, more preferably 40 or more, and particularly preferably 60 or more. When the number of effective vertical bundles is within the above range, the peel strength can be further improved, which is preferred. The number of effective vertical bundles per unit area is preferably 500 or less, more preferably 400 or less, and particularly preferably 250 or less. When the upper limit of the number of the effective vertical bundles is within the above range, the peel strength can be improved without decreasing the surface pressure of the inorganic fiber-formed article, which is preferred particularly for, for example, applications that require a satisfactory surface pressure.

[Application of Inorganic Fiber-Formed Articles]

Examples of applications of the inorganic fiber-formed article of the present invention include, but are not particularly limited to, various heat insulators and packing. In particular, the inorganic fiber-formed article is useful as a mat for an exhaust gas cleaning apparatus.

<Mat for Exhaust Gas Cleaning Apparatus>

A mat for an exhaust gas cleaning apparatus is a holding member for a catalyst carrier of the exhaust gas cleaning apparatus and is a cushioning material for the exhaust gas cleaning apparatus, the cushioning material being wrapped around the catalyst carrier and interposed (in the gap) between the catalyst carrier and a metal casing when the catalyst carrier is housed in the metal casing. The mat for an exhaust gas cleaning apparatus of the present invention is formed of the inorganic fiber-formed article of the present invention. Specifically, the inorganic fiber-formed article of the present invention is subjected to shape processing, such as cutting, to produce a mat for an exhaust gas cleaning apparatus. The inorganic fiber-formed article included in the mat for an exhaust gas cleaning apparatus of the present invention may contain an organic binder. The organic binder content is preferably less than 10% by weight, more preferably less than 5% by weight, and particularly preferably less than 2.5% by weight.

When the organic binder content of the mat is 10% by weight or more, the problem of the formation of decomposition gases, such as $NO_x$, CO, and HC, by the decomposition of the organic binder due to the high temperature of an exhaust gas at the time of engine combustion may grow.

Examples of the organic binder that can be used include various rubbers, water-soluble polymers, thermoplastic resins, and thermosetting resins.

Aqueous solutions, water-dispersible emulsions, latexes, and organic solvent solutions, each of which contains the foregoing organic binder serving as an active component, are commercially available. These organic binder liquids can be used as is or diluted with, for example, water before use. Thus they can be suitably used to incorporate the organic binder into the mat. The organic binder contained in the mat may not necessarily be a single type and may be a mixture of two or more types.

Among the foregoing organic binders, preferred are synthetic rubbers such as acrylic rubbers and nitrile rubbers, water-soluble polymers such as carboxymethyl cellulose and polyvinyl alcohols, and acrylic resins. Among these compounds, particularly preferred are acrylic rubbers, nitrile rubbers, carboxymethyl cellulose, polyvinyl alcohols, and acrylic resins that are not included in acrylic rubbers. These binders can be preferably used because the organic binder liquids are easily prepared or available, an impregnation operation of the mat is easily performed, a sufficient binding force is exerted even at a relatively low binder content, the resulting formed article is flexible with excellent strength, and the organic binders are easily decomposed or eliminated under operating temperature conditions.

[Exhaust Gas Cleaning Apparatus]

An exhaust gas cleaning apparatus includes a catalyst carrier, a casing that covers the outside of the catalyst carrier, and a mat arranged between the catalyst carrier and the casing. In the exhaust gas cleaning apparatus of the present invention, the mat for an exhaust gas cleaning apparatus of the present invention is used as the mat. The mat has high peel strength. Thus, the mat has excellent handleability and workability in assembling the exhaust gas cleaning apparatus, and has the ability to satisfactorily hold the catalyst carrier after the assembly.

The configuration of the exhaust gas cleaning apparatus is not particularly limited. The present invention can be applied to various exhaust gas cleaning apparatuses including catalyst carriers, casings, and mats for holding catalyst carriers.

EXAMPLES

While the present invention will be described more specifically below by examples and comparative examples, the present invention is not limited to these examples as long as it does not depart from the gist thereof.

Measurement and evaluation methods of various physical properties and characteristics of the resulting inorganic fiber-formed article are described below.

<Peel Test>

A test specimen having a width of 50 mm and a length of 150 mm was cut out from the inorganic fiber-formed article. A cut having a depth of 30 mm was made in the middle of the thickness of an end face 1e of the test specimen. As illustrated in FIG. 1, both ends formed by the cut were held by the respective gripping jigs 2, mounted on a tensile testing machine, and pulled in opposite directions perpendicular to the mat surface at a speed of 500 mm/min into two pieces. When the test specimen 1 was pulled into two pieces, the maximum value (N) of the peak load was measured.

<Total Volume V of the Effective Vertical Bundles>

After the peel test described above was performed, among all the vertical bundles protruding from both peeled surfaces (the first peeled surface 1a and the second peeled surface 1b) per unit area (50 mm×50 mm), the vertical bundles having a diameter of 100 μm or more and a protruding length of 2 mm or more were defined as effective vertical bundles in the region. The number (filament number), the diameter (thickness), and the length were measured, and the total volume of the effective vertical bundles was determined. The diameter, the length, the number, and so forth of the effective vertical bundles were measured by observing the peeled surfaces with a digital microscope (VHX-5000, available from Keyence Corporation) at a magnification of ×10.

<Percentage (L'/z)·100% of Average Length of Effective Vertical Bundles>

After the peel test was performed, the percentage of the average length of the effective vertical bundles per unit area (50 mm×50 mm) was determined by dividing the average length L' of the effective vertical bundles on the first peeled surface by the thickness z of the second peeled surface (one-half of the thickness of the inorganic fiber-formed article subjected to the test).

<Method for Measuring Number of Needle Marks>

The inorganic fiber-formed article was cut into a square having a size of 50 mm×50 mm to obtain a sample. One surface of the sample was irradiated with visible light. The number of all needle marks per unit area was counted by counting the number of spots of light transmitted to the peeled surface and the vertical bundles.

Comparative Example 1

A silica sol was added to an aqueous solution of basic aluminum chloride (aluminum content: 165 g/L, Al/Cl=1.8 (atomic ratio)) in such a manner that an ultimately obtained alumina fiber composition satisfied $Al_2O_3$:$SiO_2$=72:28 (ratio by weight). A polyvinyl alcohol was added thereto, and then the mixture was concentrated to prepare a spinning solution having a viscosity of 70 poise (25° C.) and an alumina-silica content of about 35% by weight. Fibers were spun from the spinning solution by a blowing method. The resulting fibers were collected to form an aggregate of an alumina/silica-based fiber precursor.

The fibers were spun from the spinning solution by the blowing method. A spinning nozzle having the same structure as illustrated in FIG. 6 of Japanese Patent No. 2602460 was used. The fibers were collected in the form of a continuous sheet (thin-layer sheet) with an accumulating device having a structure in which a wire-mesh endless belt was positioned so as to be substantially perpendicular to the spinning airflow and in which the spinning airflow containing the alumina/silica-based fiber precursor impinged on the belt while the endless belt was rotated.

The thin-layer sheet recovered by the accumulating device was subjected to the application of a friction-reducing agent by spraying, continuously unwound, and fed to a folding device. The thin-layer sheet was folded to a predetermined width and stacked. Simultaneously, the folded sheet was continuously transferred in a direction perpendicular to a folding direction to form a laminated sheet (inorganic fiber aggregate). As the foregoing folding device, a folding device having the same structure as described in Japanese Unexamined Patent Application Publication No. 2000-80547 was used.

Needling was performed by punching with a needle-punching machine.

Next, firing was performed at 1,200° C. to form an inorganic fiber-formed article (fired fibers) having a basis weight of 2,800 g/m² and being formed of crystalline alumina/silica-based fibers. The firing was performed with an electric furnace by heating to 1,200° C. at a rate of temperature increase of 5° C./min, holding at 1,200° C. for 30 minutes, and then naturally cooling.

The composition ratio of the resulting crystalline alumina/silica-based fibers was alumina/silica=72/28 (ratio by weight). The average fiber diameter (average value of 100 fibers) of the crystalline alumina/silica-based fibers was measured by the observation of the inorganic fiber-formed article with a microscope and found to be 5.5 µm.

Tables 1 and 2 present the measurement results of the peel strength and so forth of the resulting inorganic fiber-formed article.

Example 1

An inorganic fiber-formed article of Example 1 was produced as in Comparative Example 1, except that a needling aid was coated before the needling. Specifically, after the friction-reducing agent was attached to the inorganic fiber aggregate, a 10% solution of "Yukaformer (registered trademark) 301," available from Mitsubishi Chemical Corporation, in ethanol was coated as a needling aid in an amount of 32 g/m² by spraying, and then the needling was performed. After the coating of the needling aid, the inorganic fiber aggregate was not dried. The term "WET" in Table 1 refers to wet coating. Tables 1 and 2 present the measurement results of the peel strength and so forth of the inorganic fiber-formed article of Example 1.

Example 2

An inorganic fiber-formed article of Example 2 was produced as in Example 1, except for coating of a needling aid. Regarding the coating of the needling aid, specifically a 5% solution of "Diaformer (registered trademark) Z-631," available from Mitsubishi Chemical Corporation, in ethanol was coated as a needling aid in an amount of 34 g/m² and dried at 50° C. for 60 minutes. Then the needling was performed. Tables 1 and 2 present the measurement results of the peel strength and so forth. The term "DRY" in Table 1 refers to dry coating.

Example 3

An inorganic fiber-formed article of Example 3 was produced as in Example 2, except that after the coating of the needling aid the drying step was not performed (wet coating was performed). Specifically, a 5% solution of "Diaformer (registered trademark) Z-631," available from Mitsubishi Chemical Corporation, in ethanol was coated as a needling aid in an amount of 34 g/m². Tables 1 and 2 present the measurement results of the peel strength and so forth.

Example 4

Needling was performed in the same manner as in Comparative Example 1. Precursor fiber filaments (byproduct formed during the production of the aggregate) having an average diameter of 1,300 µm and an average length of 80 mm were arranged on the resulting inorganic fiber aggregate at 5.7 filaments/cm². The substantially middle portions of the filaments were pushed into the aggregate with a fork needle, and the needling was performed again. The firing and the subsequent steps were performed in the same manner as in Comparative Example 1 to produce an inorganic fiber-formed article of Example 4. Tables 1 and 2 present the measurement results of the peel strength and so forth.

Example 5

An inorganic fiber-formed article of Example 5 was produced as in Example 4, except that, as the filaments arranged on the inorganic fiber aggregate, precursor fiber filaments (byproduct during the production of the aggregate) having an average diameter of 1,000 µm and an average length of 80 mm were arranged at 1.1 filaments/cm². Tables 1 and 2 present the measurement results of the peel strength and so forth.

TABLE 1

| | | Comparative Example 1 | Example 1 | Example 2 | Example 3 | Example 4 | Example 5 |
|---|---|---|---|---|---|---|---|
| Configuration of inorganic fiber-formed article | Basis weight (g/m²) | 2,800 | 2,800 | 2,800 | 2,800 | 2,800 | 2,800 |
| | Total volume of effective vertical bundle (mm³/cm²) | 1.8 | 23.9 | 24.0 | 16.3 | 92.3 | 37.3 |
| | Needle mark density (marks/cm²) | 8.2 | 10.2 | 9.3 | 9.3 | 9.9 | 10.5 |
| | Average volume of effective vertical bundle per needle mark (mm³/mark) | 0.2 | 2.3 | 2.6 | 1.7 | 9.3 | 3.6 |
| | Number of effective vertical bundles (filaments/cm²) | 2.1 | 5.1 | 4.7 | 3.9 | 7.6 | 6.8 |
| | Average volume per effective vertical bundle (mm³/filament) | 0.87 | 4.71 | 5.09 | 4.19 | 12.14 | 5.52 |

TABLE 1-continued

|  |  |  | Comparative Example 1 | Example 1 | Example 2 | Example 3 | Example 4 | Example 5 |
|---|---|---|---|---|---|---|---|---|
|  | Needling condition | Coated state of needling aid | (—) | WET | DRY | WET | (—) | (—) |
|  |  | Amount of needling aid coated (wt %) |  | 0.17 | 0.08 | 0.07 |  |  |
|  |  | Number of thick filaments arranged (filaments/cm²) | (—) | (—) | (—) | (—) | 5.7 | 1.1 |
| Evaluation | Peel strength (N) |  | 2.6 | 7.3 | 7.6 | 5.2 | 31.1 | 11.0 |

TABLE 2

|  |  | Comparative Example 1 | Example 1 | Example 2 | Example 3 | Example 4 | Example 5 |
|---|---|---|---|---|---|---|---|
| Effective vertical bundle | Average thickness per filament (μm) | 533 | 875 | 949 | 885 | 1,282 | 965 |
|  | Percentage of length per filament (%) | 36.3 | 78.3 | 73.6 | 77.5 | 111.2 | 70.1 |
| Number of effective vertical bundles/number of needle marks |  | 0.26 | 0.50 | 0.51 | 0.42 | 0.77 | 0.64 |

As presented in Table 1, the inorganic fiber-formed articles of Examples 1 to 5 had high peel strength even though they had large weights per unit area (basis weight). In Comparative Example 1, although the article produced by a conventional method was formed to have high basis weight, the average volume of the effective vertical bundles per needle mark was small, and the peel strength was insufficient. As described above, the needling was efficiently performed by, for example, subjecting the filaments strengthened with the needling aid to the needling or by performing the needling using the thick filaments, thereby increasing the average volume of the effective vertical bundles per needle mark. In the first embodiment, it was found that since the average volume of the effective vertical bundles per needle mark, which is determined by the peel test, is increased, the inorganic fiber-formed article having both high basis weight and excellent peel strength can be obtained.

As presented in Table 1, it was found that the average volume per effective vertical bundle can be increased by, for example, subjecting the filaments strengthened with the needling aid to the needling or by performing the needling using the thick filaments. In the second embodiment, it was found that since the average volume per effective vertical bundle, which is determined by the peel test, is increased, the inorganic fiber-formed article having both high basis weight and excellent peel strength can be obtained.

While the present invention has been described by the specific embodiments, it will be obvious to those skilled in the art that various changes may be made without departing from the purpose and scope of the invention.

This application is based on Japanese Patent Application No. 2019-144390 filed Aug. 6, 2019 and Japanese Patent Application No. 2020-092409 filed May 27, 2020, which are hereby incorporated by reference herein in their entirety.

REFERENCE SIGNS LIST 1 test specimen of inorganic fiber-formed article
2 gripping jig

The invention claimed is:

1. An article, comprising:
   inorganic fibers; and
   needle marks extending in a thickness direction and each including a vertical bundle comprising inorganic fibers extending in the thickness direction,
   wherein
   (I) the article has a basis weight of 1,800 g/m² or more, and
   (II-1) an average volume of an effective vertical bundles per needle mark (v/n), determined by dividing a total volume of the effective vertical bundles in the region (v) by the number of the needle marks in the region (n), is 0.5 mm³ or more,
   wherein the effective vertical bundles are vertical bundles having a diameter of 100 μm or more and a protruding length of 2 mm or more among vertical bundles protruding from peeled surfaces in a region measuring 50 mm×50 mm after a peel test is performed, and
   in the peel test, a test specimen having a width of 50 mm and a length of 150 mm is cut out from the article, a cut having a depth of 30 mm is made in a middle of a thickness of an end face of the test specimen, and both ends formed by the cut are held by gripping jigs, mounted on a tensile testing machine, and pulled in opposite thickness directions at a speed of 500 mm/min into two pieces, or
   (II-2) an average volume per an effective vertical bundle (V/N), determined by dividing the total volume of the effective vertical bundles (V) by the number of the effective vertical bundles (N), is 1.0 mm³ or more.

2. The article according to claim 1, wherein a needle mark density is 1 to 100 marks/cm².

3. The article according to claim 1, wherein a maximum peel strength determined as a peak load in the peel test is 5.0 N or more.

4. The article according to claim 1, wherein the inorganic fibers are alumina/silica- based fibers.

5. The article according to claim 1, wherein the average volume of the effective vertical bundles per needle mark (v/n) is 0.5 mm$^3$ or more.

6. The article according to claim 1, wherein the average volume per an effective vertical bundle (V/N) is 1.0 mm$^3$ or more.

7. A mat for an exhaust gas cleaning apparatus, comprising the article according to claim 1.

8. An exhaust gas cleaning apparatus, comprising a catalyst carrier, a casing that covers an outside of the catalyst carrier, and a mat interposed between the catalyst carrier and the casing, wherein the mat is the mat according to claim 7.

* * * * *